(12) United States Patent
Liu et al.

(10) Patent No.: US 9,153,265 B1
(45) Date of Patent: Oct. 6, 2015

(54) HEAD SLIDER WITH ADJUSTED THERMAL PROFILE

(71) Applicant: Seagate Technology LLC, Cupertino, CA (US)

(72) Inventors: Xiong Liu, Singapore (SG); Lihong Zhang, Singapore (SG); Samuel Gan, Singapore (SG); Shashwat Shukla, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/466,141

(22) Filed: Aug. 22, 2014

(51) Int. Cl.
*G11B 5/60* (2006.01)

(52) U.S. Cl.
CPC ........................................ *G11B 5/60* (2013.01)

(58) Field of Classification Search
CPC ............ G11B 5/60; G11B 5/33; G11B 5/127; G11B 5/147
USPC ......... 360/234.4, 234.5, 324.1, 125.3, 125.03
See application file for complete search history.

(56) References Cited

U.S. PATENT DOCUMENTS

| | | | |
|---|---|---|---|
| 5,473,486 A | 12/1995 | Nepela et al. | |
| 5,781,377 A | 7/1998 | Koka et al. | |
| 6,661,605 B1* | 12/2003 | Pust et al. | 360/125.71 |
| 6,747,841 B1* | 6/2004 | Olim et al. | 360/125.39 |
| 6,842,308 B1 | 1/2005 | Pust et al. | |
| 7,092,208 B2 | 8/2006 | Zou et al. | |
| 7,460,335 B2 | 12/2008 | Maruyama et al. | |
| 8,493,820 B1* | 7/2013 | Langlais et al. | 369/13.33 |
| 2006/0221498 A1* | 10/2006 | Bonhote et al. | 360/126 |
| 2008/0266722 A1* | 10/2008 | Kawasaki et al. | 360/319 |
| 2009/0268335 A1* | 10/2009 | Huang et al. | 360/75 |

\* cited by examiner

*Primary Examiner* — Allen T Cao
(74) *Attorney, Agent, or Firm* — Hollingsworth Davis, LLC

(57) ABSTRACT

A slider generally comprises a substrate forming at least part of a body of the slider, a heat-assisted media recording (HAMR) read/write transducer proximate the substrate, and an end cap substantially encapsulating the HAMR read/write transducer. The end cap has a first surface proximate the substrate and a second surface as a trailing edge of the slider. The end cap has a first coefficient of thermal expansion (CTE) similar to a corresponding CTE of the substrate. At least a portion of the second surface of the end cap has a second CTE that is lower than the first CTE. A body of the end cap is intermediate to the first and second surfaces of the end cap and has a CTE intermediate of the first and second CTE.

18 Claims, 2 Drawing Sheets

HEAD SLIDER WITH ADJUSTED THERMAL PROFILE

SUMMARY

A slider generally comprises a substrate forming at least part of a body of the slider, a heat-assisted media recording (HAMR) read/write transducer proximate the substrate, and an end cap substantially encapsulating the HAMR read/write transducer. The end cap has a first surface proximate the substrate and a second surface as a trailing edge of the slider. The end cap has a first coefficient of thermal expansion (CTE) similar to a corresponding CTE of the substrate. At least a portion of the second surface of the end cap has a second CTE that is lower than the first CTE. A body of the end cap is intermediate to the first and second surfaces of the end cap and has a CTE intermediate of the first and second CTE.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
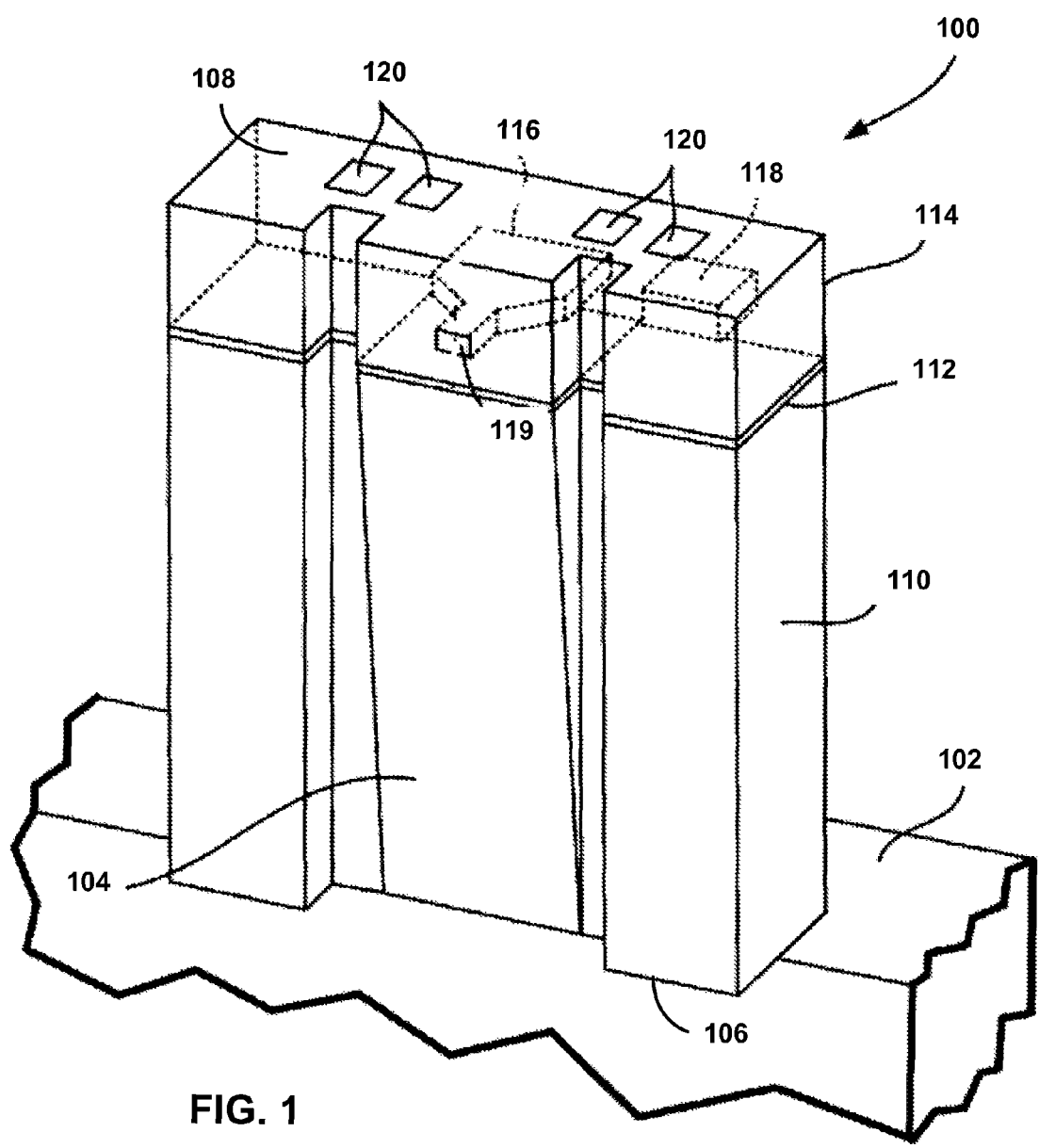
FIG. 1 is a perspective view of a HAMR a slider of an example embodiment.

The present disclosure is directed to apparatus, systems and methods to reduce thermal profile changes of head sliders in heat assisted magnetic recording (HAMR) drives through the use of selected materials in the trailing edge cap and/or substrate of the slider body.

HAMR generally refers to the concept of locally heating a recording medium with a laser to reduce the coercivity. This allows the applied magnetic writing fields to more easily direct the magnetization during temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the coercivity is reduced such that the magnetic write field is sufficient to write to the media. Once the media cools to ambient temperature, the coercivity has a sufficiently high value to assure thermal stability of the recorded information.

In a HAMR magnetic data storage and retrieval system, a thin film transducing head, which is also known as a slider, may include a transducer, a substrate upon which the transducer is built, and an encapsulating end cap layer at the trailing edge of the transducing head. The transducer may include a writer portion, assisted by a thin beam laser, to record magnetically encoded information on a magnetic media and a reader portion to retrieve magnetically encoded information. During operation, the slider is positioned in close proximity to the magnetic media. The distance between the slider and the media is small enough to allow for writing to and reading from the magnetic media and large enough to prevent contact between the magnetic media and the slider.

During HAMR write operations the laser can be subject to a high power loss which is largely converted to heat. The heat affects the various layers/elements of the slider in different ways as each of the layers/elements are made from different materials having different coefficients of thermal expansion (CTEs). For example, the substrate of the slider is may be comprised of aluminum oxide/titanium carbide (AlTiC), the end cap layer of alumina, and the transducer of many layers including metals. The CTE for TiC is $7.7 \times 10^{-6}/°$ C. linear while the CTE for alumina is $8.1 \times 10^{-6}/°$ C. linear. Metallic layers have a very high CTE. All elements of the slider are subject to expansion and deformation caused by the heat of the laser. The deformed head slider will protrude towards the disk surface causing changes in head-disk clearance, which is controlled at nanometer range, for example, ~1.5 nm or less, and in air-bearing flyability; these changes may lead to problematic clearance control and head-disk contact. The heat may also cause the elements along the path of the laser to expand in a lateral dimension which can affect servo and read/write performances of the slider head. Thermal-fly-height (TFC) heaters are used to help control thermal expansion to achieve a low flight-height recording; however, more can be done to control thermal expansion through the optimization of materials chosen for the slider body.

FIG. 1 illustrates a perspective view of an example HAMR recording head slider 100 attached to suspension 102. Slider 100 presents an air bearing surface (ABS) 104, a leading edge 106 and a trailing edge 108, and generally comprises a substrate 110, an optional insulating layer 112, and an encapsulating trailing edge cap 114. Trailing edge cap 114 encapsulates a magnetic HAMR transducer 116, an electromagnetic energy source, e.g., laser, 118, and other microelectronic and associated photonic elements and circuitry, which can include, for example, shields, TFC heaters, and sensors (not shown). Transducer 116 meets the ABS 104 at media facing surface interface 119. Trailing edge cap 114 is additionally provided with external electrical contacts 120.

As explained above, the trailing edge cap alumina and AlTiC substrate of slider bodies may have significant CTEs, which make them protrude/deform heavily under the write duty cycle laser heat in HAMR drives. To improve thermal profile changes, materials of low CTEs are used in slider bodies especially in high-heat areas. In an example embodiment, the sputtered alumina of the trailing edge cap 114 is replaced with a carbide, nitride, or oxide of a very low CTE. Preferred examples of materials for the trailing edge cap 114 and their CTE values are provided in Table 1 below, with the highest CTE value being $6.9 \times 10^{-6}/°$ C. linear.

TABLE 1

Coefficient of Thermal Expansion of Selected Ceramics

| Ceramic | CTE ($\times 10^{-6}/°$ C.) |
| --- | --- |
| AlN | 4.6 |
| BN | 2.2 |
| $Si_3N_4$ | 3.3 |
| GeN | 5.6 |
| GaN | 4.5 |
| $B_4C$ | 5.5 |
| SiC | 2.8 |

TABLE 1-continued

Coefficient of Thermal Expansion of Selected Ceramics

| Ceramic | CTE ($\times 10^{-6}$/° C.) |
| --- | --- |
| HfC | 6.6 |
| ZrC | 6.9 |
| WC | 4.3 |
| $W_2C$ | 5.8 |
| NbC | 6.6 |
| TaC | 6.3 |
| $HfB_2$ | 5.0 |
| $ZrB_2$ | 5.9 |
| $TiB_2$ | 5.5 |
| $VB_2$ | 5.3 |
| $CrB_2$ | 5.7 |
| ZnO | 4.0 |
| $SiO_2Al_2O_3$ | 5.1 |
| $SiO_2ZrO_2$ | 4.5 |
| $CaOHfO_2$ | 3.3 |
| Si | 2.6 |
| $SiO_2$ | 2.6 |
| $ZrW_2O_8$ | (−6) − (−9) |
| $ZrMo_2O_8$ | −11 |
| $HfW_2O_8$ | −10 |
| $ZrV_2O_7$ | (−1) − (7.1) |
| ScW3O12 | −2.2 |
| $ReO_3$ | (−0.5) − (−0.7) |
| $LiAlSiO_4$ | (−1) − (−6) |
| $Mn_3Cu_{0.53}Ge_{0.47}N$ | −16 |
| $Mn_3Zn_{0.4}Sn_{0.6}N_{0.85}C_{0.15}$ | −23 |
| $Mn_3Zn_{0.5}Sn_{0.5}N_{0.85}C_{0.1}B_{0.05}$ | −30 |
| $(HfMg)(WO_4)$ | −2 |
| $Bi_{0.95}La_{0.05}NiO_3$ | −82 |

Note:
CTE in Table 1 may vary with the structure, structure orientation, application temperature, pressure and the preparation conditions, for example, vacuum pressure, gas composition, substrate temperature and deposition technique.

The materials in Table 1 may be used in pure phases or as components in composite materials with tailored thermal expansion coefficients. The atomic ratio in the materials may vary slightly which may correspondingly vary the thermal expansion coefficient of the materials. For example, $ZrW_2O_8$ may have varied atomic ratio which in general expressed $ZrW_xO_y$, in which the values of X and Y vary within a range.

Compounds belonging to the zirconium vanadate family have a general formula of $AM_2O_7$. When M=V, the A cation can be Zr and Hf. When M=As, the A cation can be Zr or Th. When M=P, the A cation can be Zr, Hf, Ti, U, Th, Pu, Ce, Mo, W, Re, Pb, Sn, Ge, or Si. The vanadate and phosphate compounds exist in a cubic structure in space group of $Pa3^-$. These compounds adopt a NaCl structure made up of $AO_6$ octahedra and $M_2O_7$ units.

The materials of Table 1 may be prepared by vacuum deposition techniques such as chemical vapor deposition, sputtering, cathodic arc deposition, laser beam ablation, etc. While the materials of Table 1 present CTEs significantly lower than the CTE of sputtered alumina, these materials also have acceptable hardness and large optical band gaps from 3 to 6 eV, which make them wear-resistant and electrically insulating and, therefore, desirable selections for the trailing edge cap 114 to resist profile changes under the write cycle laser heat in HAMR drives. The materials for the trailing edge cap 114 are most appropriate when they also have a low intrinsic stress (compressive and tensile) relative to the transducer electronics so as to protect the electronics. Low intrinsic stress for the trailing edge cap materials of Table 1 can be obtained by regulating the substrate bias/temperature, deposition rate and gas pressure during vacuum deposition.

Figure 2:
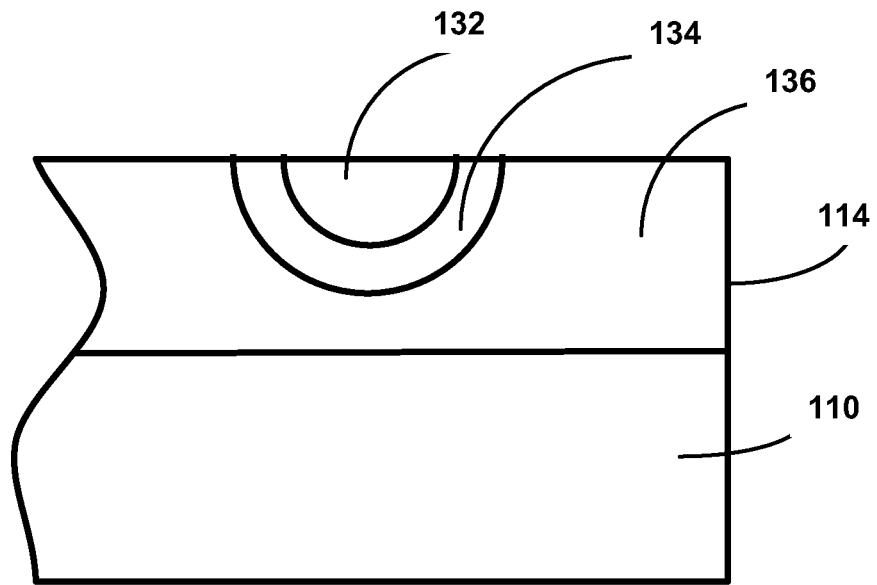
FIG. 2 is a sectional view of a trailing edge cap of an example embodiment.

In another example embodiment, see FIG. 2, the trailing edge cap 114, adjacent substrate 110, is designed to incorporate multiple materials, such as those from Table 1. In this embodiment, the trailing edge cap is presented in a configuration where a first material 130 surrounds or encapsulates the area of highest heat, for example, around the read/write transducers (not shown) and the laser near-field transducer (not shown), is of the lowest CTE. A second material 132 surrounding or encapsulating the first material 130 may be of a slightly higher CTE, a third material 134 surrounding or encapsulating the second material may be of a still slightly higher CTS than material 132, and so on. Any number of layers of materials may be used with the low CTE material increasing in CTE value from the area of highest heat within the slider out to the substrate 110. The materials with a CTE approximating or greater than $7 \times 10^{-6}$/° C. linear are nearest the substrate 110 while the materials of Table 1 with a CTE at or less than $5 \times 10^{-6}$/° C. linear, (e.g., at or less than $3 \times 10^{-6}$/° C. linear), are nearest the trailing edge 108.

Figure 3:
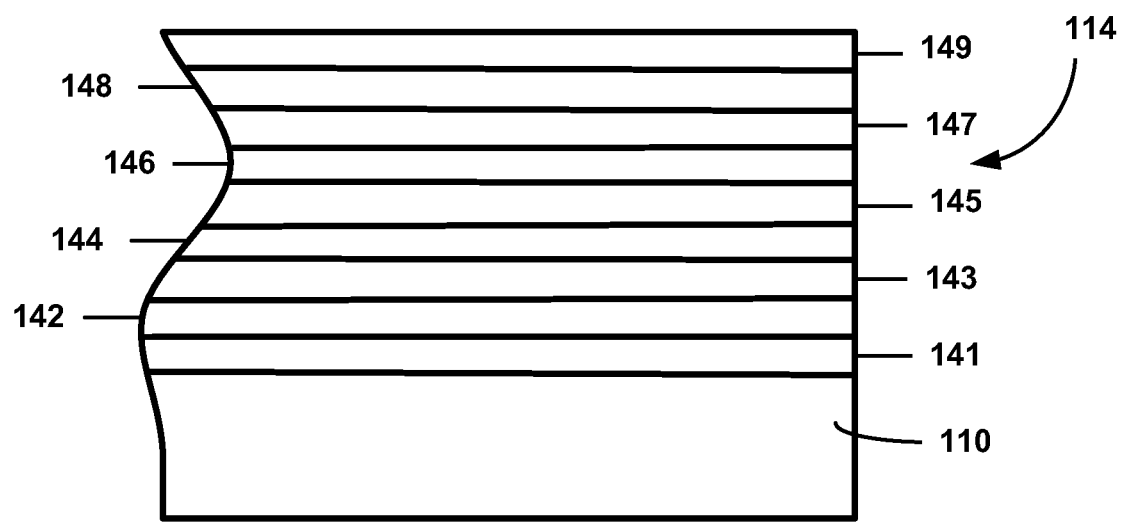
FIG. 3 is a sectional view of a trailing edge cap of an example embodiment.

In another example embodiment, the material chosen for the trailing edge end cap 114 has a CTE comparable to that of the AlTiC slider body 110, see FIG. 3. In this embodiment, the trailing edge end cap 114 is in a laminated configuration presenting layers, e.g., 141-149, whose CTE gradually decreases towards the extreme edge (layer 149). As carbides and nitrides possess good adhesion to one another, the material of the cap end layer (layer 141) can either be a carbide or nitride so as to bind well with the AlTiC substrate 110 of the slider body 100; the AlTiC substrate has ~30 wt. % of carbide as TiC. Once again, the materials with a CTE approximating or greater than $7 \times 10^{-6}$/° C. linear are nearest the substrate 110 while the materials of Table 1 with a CTE at or less than $5 \times 10^{-6}$/° C. linear, e.g., at or less than $3 \times 10^{-6}$/° C. linear, are nearest the trailing edge 108.

In another example embodiment, represented again by FIG. 1, a configuration of the low CTE trailing edge cap 114, such as those described above, is combined with a slider body substrate 110 of a low CTE. In this embodiment, the slider body substrate 110, may include AlTiC or similar material having a significant thermal expansion tendency, is instead made of a material or materials having low CTEs so as to reach an optimal thermal compatibility with the trailing edge cap 114. A low CTE edge cap 114 in combination with a low CTE slider body substrate 110 can altogether reduce the thermal profile changes for the whole head slider 100 under the write duty cycle laser heat in HAMR drives. Example slider body substrate 110 materials include SiC, ZrC, Si, metal oxide and carbide composites and have a CTE of $3 \times 10^{-6}$/° C. linear or less. These materials also have high hardness and acceptable electrical conductivity.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A slider comprising:
a substrate forming at least part of a body of the slider;
a heat-assisted media recording (HAMR) read/write transducer proximate the substrate; and
an end cap substantially encapsulating the HAMR read/write transducer, the end cap having a first surface proximate the substrate and a second surface as a trailing edge of the slider, the first surface of the end cap having a first coefficient of thermal expansion (CTE) similar to a corresponding CTE of the substrate, at least a portion of the second surface of the end cap having a second CTE lower than the first CTE, and a body of the end cap intermediate the first and second surfaces having a CTE intermediate the first and second CTEs.

2. The slider of claim 1, wherein the first CTE and the corresponding CTE are greater than $7\times10^{-6}/°$ C. linear and the second CTE is less than $5\times10^{-6}/°$ C. linear.

3. The slider of claim 1, wherein the body of the end cap gradually transitions from the first CTE to the second CTE.

4. The slider of claim 3, wherein the end cap comprises layers of materials of decreasing CTE from the first surface to the second surface, the materials comprising at least one of carbide composites and nitride composites.

5. The slider of claim 1, wherein the portion of the second surface of the end cap having a second CTE lower than the first CTE is localized at the HAMR read/write transducer.

6. The slider of claim 1, wherein the substrate comprises at least one of SiC, ZrC, Si, metal oxide composites and carbide composites having a CTE less than $3\times10^{-6}/°$ C. linear.

7. The slider of claim 1, wherein the first CTE and the corresponding CTE are greater than $7\times10^{-6}/°$ C. linear and the second CTE is less than $5\times10^{-6}/°$ C. linear.

8. The slider of claim 1, wherein the body of the end cap gradually transitions from the first CTE to the second CTE.

9. The slider of claim 8, wherein the end cap comprises layers of materials of decreasing CTE from the first surface to the second surface, the materials comprising one or more of carbide composites and nitride composites.

10. The slider of claim 1, wherein the portion of the second surface of the end cap having the second CTE is localized proximate the HAMR read/write transducer.

11. A slider comprising:
a substrate forming at least part of a body of the slider, the substrate comprising at least one of SiC, ZrC, Si, metal oxide composites, and carbide composites having a first coefficient of thermal expansion (CTE) less than $3\times10^{-6}/°$ C. linear;
a heat-assisted media recording (HAMR) read/write transducer proximate the substrate; and
an end cap substantially encapsulating the HAMR read/write transducer and proximate the substrate, and having a second CTE different from the first CTE.

12. The slider of claim 11, wherein the end cap has a first surface proximate the substrate, a second surface as a trailing edge of the slider, and a body portion intermediate the first and second surfaces, and wherein the first surface has a first surface CTE similar to the first CTE of the substrate, the second surface having at least a portion that has a second surface CTE less than the first surface CTE, and the body portion has a CTE intermediate the first surface CTE and the second surface CTE.

13. The slider of claim 12, wherein the second surface CTE is less than $3\times10^{-6}/°$ C. linear.

14. The slider of claim 12, wherein the CTE of the body portion of the end cap gradually transitions from the first surface CTE to the second surface CTE.

15. The slider of claim 12, wherein the portion of the second surface having the second surface CTE is localized proximate the HAMR read/write transducer.

16. The slider of claim 11, wherein the second CTE of the end cap gradually transitions to a lower CTE in relation to a further distance from the substrate.

17. The slider of claim 11, wherein the end cap comprises at least two layers and wherein each layer comprises at least one of a carbide composite and a nitride composite.

18. A slider comprising:
an AlTiC substrate forming at least part of a body of the slider;
a heat-assisted media recording (HAMR) read/write transducer proximate the substrate; and
an end cap substantially encapsulating the HAMR read/write transducer, the end cap having a first surface proximate the substrate and a second surface as a trailing edge of the slider, the first surface of the end cap having a first coefficient of thermal expansion (CTE) similar to a corresponding CTE of the substrate, at least a portion of the second surface of the end cap having a second CTE lower than the first CTE, and a body of the end cap intermediate the first and second surfaces having a CTE intermediate the first and second CTEs.

* * * * *